(12) United States Patent
Gupta

(10) Patent No.: US 9,380,444 B2
(45) Date of Patent: Jun. 28, 2016

(54) SYSTEMS AND METHODS FOR WLAN NETWORK SELECTION

(71) Applicant: Intel IP Corporation, Santa Clara, CA (US)

(72) Inventor: Vivek Gupta, Milpitas, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 107 days.

(21) Appl. No.: 14/126,900

(22) PCT Filed: Sep. 27, 2013

(86) PCT No.: PCT/US2013/062384
§ 371 (c)(1),
(2) Date: Dec. 17, 2013

(87) PCT Pub. No.: WO2014/130094
PCT Pub. Date: Aug. 28, 2014

(65) Prior Publication Data
US 2014/0295913 A1  Oct. 2, 2014

Related U.S. Application Data

(60) Provisional application No. 61/768,330, filed on Feb. 22, 2013.

(51) Int. Cl.
*H04M 1/00* (2006.01)
*H04W 8/00* (2009.01)
(Continued)

(52) U.S. Cl.
CPC ........... *H04W 8/005* (2013.01); *H04L 12/4633* (2013.01); *H04L 27/2614* (2013.01);
(Continued)

(58) Field of Classification Search
CPC ...................................................... H04W 8/005
USPC .................... 455/552.1, 557, 435.3, 445, 466
See application file for complete search history.

(56) References Cited

U.S. PATENT DOCUMENTS 7,620,065 B2 * 11/2009 Falardeau ..................... 370/465
8,060,612 B1   11/2011 Mangal et al.
(Continued)

FOREIGN PATENT DOCUMENTS

WO  2012149954 A1  11/2012
WO  2014/130094 A1  8/2014

OTHER PUBLICATIONS

Bari, et al., "Automated Network Selection in a Heterogeneous Wireless Network Environment", IEEE Network Jan./Feb. 2007, pp. 34-40.
(Continued)

*Primary Examiner* — Sanh Phu
(74) *Attorney, Agent, or Firm* — Stoel Rives LLP

(57) ABSTRACT

Methods, systems, and devices for network selection are disclosed herein. User equipment (UE) includes a communication component, a rules component, and a network selection component. The communication component may be configured to communicate over a 3GPP network and a non-cellular network. The rules component may be configured to store an access network discovery and selection function (ANDSF) management object (MO) that includes wireless local area network (WLAN) selection policies for network selection on the UE. The WLAN selection policies may include interworking WLAN (I-WLAN) policies and Hotspot 2.0 (HS2.0) parameters. The network selection component is configured to select an available WLAN based on the ANDSF MO.

13 Claims, 6 Drawing Sheets

(51) Int. Cl.
| | |
|---|---|
| H04W 72/04 | (2009.01) |
| H04W 74/02 | (2009.01) |
| H04W 76/02 | (2009.01) |
| H04W 72/00 | (2009.01) |
| H04W 76/04 | (2009.01) |
| H04L 12/46 | (2006.01) |
| H04W 4/00 | (2009.01) |
| H04L 29/12 | (2006.01) |
| H04W 28/02 | (2009.01) |
| H04W 40/02 | (2009.01) |
| H04W 48/18 | (2009.01) |
| H04W 24/06 | (2009.01) |
| H04W 74/00 | (2009.01) |
| H04W 74/04 | (2009.01) |
| H04W 74/08 | (2009.01) |
| H04W 36/00 | (2009.01) |
| H04W 36/30 | (2009.01) |
| H04L 27/26 | (2006.01) |
| H04W 40/24 | (2009.01) |
| H04W 24/02 | (2009.01) |
| H04W 88/06 | (2009.01) |
| H04L 12/725 | (2013.01) |
| H04W 28/08 | (2009.01) |

(52) U.S. Cl.
CPC ........... *H04L61/2539* (2013.01); *H04W 4/005* (2013.01); *H04W 4/008* (2013.01); *H04W 24/02* (2013.01); *H04W 24/06* (2013.01); *H04W 28/02* (2013.01); *H04W 28/0289* (2013.01); *H04W 36/0088* (2013.01); *H04W 36/30* (2013.01); *H04W 40/02* (2013.01); *H04W 40/244* (2013.01); *H04W 48/18* (2013.01); *H04W 72/005* (2013.01); *H04W 72/0413* (2013.01); *H04W 72/0446* (2013.01); *H04W 74/002* (2013.01); *H04W 74/02* (2013.01); *H04W 74/04* (2013.01); *H04W 74/08* (2013.01); *H04W 76/023* (2013.01); *H04W 76/043* (2013.01); *H04L 45/30* (2013.01); *H04W 28/08* (2013.01); *H04W 88/06* (2013.01); *Y02B 60/50* (2013.01)

(56) References Cited

U.S. PATENT DOCUMENTS

| | | |
|---|---|---|
| 2007/0254646 A1 | 11/2007 | Sokondar |
| 2010/0017603 A1 | 1/2010 | Jones |
| 2013/0012260 A1 | 1/2013 | Salkintzis et al. |
| 2013/0034019 A1 | 2/2013 | Mustajarvi |

OTHER PUBLICATIONS

Nguyen-Vuong, et al., "Terminal-Controlled Mobility Management in Heterogeneous Wireless Networks", Topics in Network and Service Management, IEEE Communications Magazine, Apr. 2007, pp. 122-129.

Song, et al., "Load Balancing for Cellular/WLAN Integrated Networks", IEEE Network Jan./Feb. 2007, pp. 27-33.

International Search Report and Written Opinion received for PCT Patent Application No. PCT/US2013/062384, mailed on Jan. 8, 2014, 10 pages.

* cited by examiner

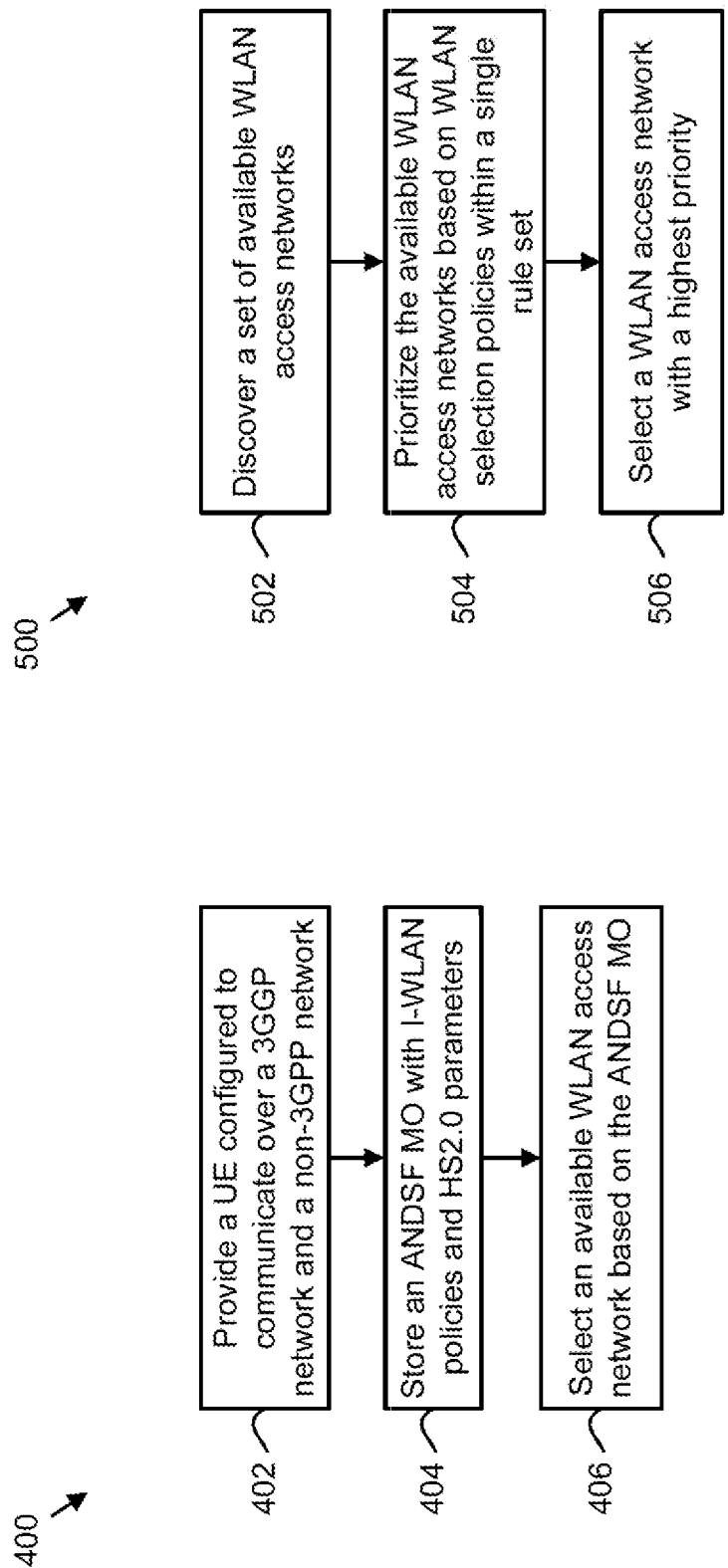

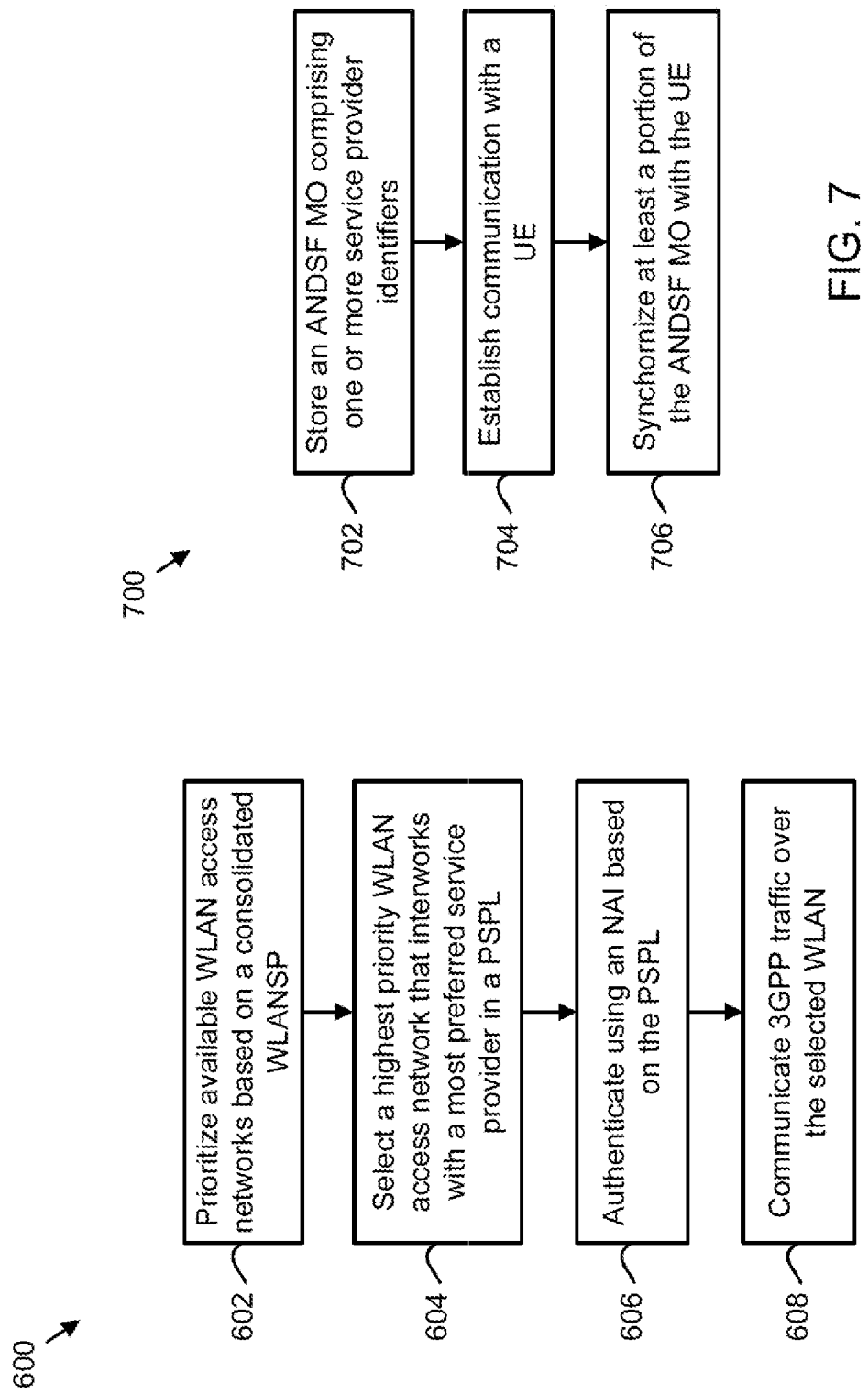

SYSTEMS AND METHODS FOR WLAN NETWORK SELECTION

RELATED APPLICATIONS

This application is the National Stage of International Application No. PCT/US2013/062384, filed Sep. 27, 2013, which claims the benefit under 35 U.S.C. §119(e) of U.S. Provisional Application No. 61/768,330, filed Feb. 22, 2013, which is incorporated by reference herein in its entirety.

TECHNICAL FIELD

The present disclosure relates to wireless local area network (WLAN) network selection.

BRIEF DESCRIPTION OF THE DRAWINGS

FIG. 4 is a schematic diagram illustrating a method for network selection consistent with embodiments disclosed herein.

FIG. 5 is a schematic diagram illustrating another method for network selection consistent with embodiments disclosed herein.

FIG. 6 is a schematic diagram illustrating yet another method for network selection consistent with embodiments disclosed herein.

FIG. 7 is a schematic diagram illustrating a method for synchronizing network selection rules consistent with embodiments disclosed herein.

DETAILED DESCRIPTION OF PREFERRED EMBODIMENTS

Figure 1:
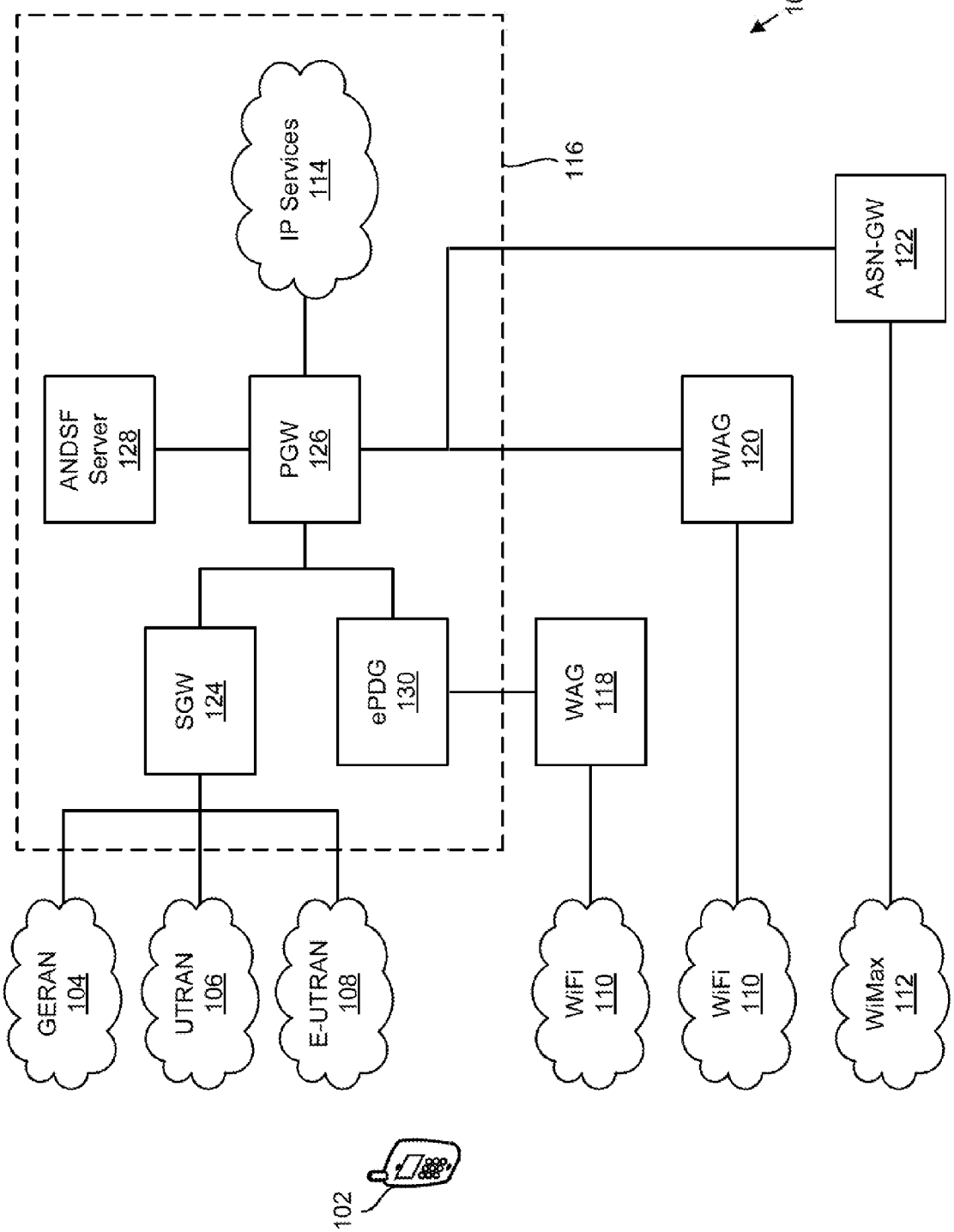
FIG. 1 is a schematic diagram illustrating a communication system consistent with embodiments disclosed herein.

A detailed description of systems and methods consistent with embodiments of the present disclosure is provided below. While several embodiments are described, it should be understood that disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as WiMAX (Worldwide Interoperability for Microwave Access); and the IEEE 802.11 standard, which is commonly known to industry groups as Wi-Fi. In 3GPP radio access networks (RANs) in LTE systems, the base station can include Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in an E-UTRAN, which communicate with a wireless communication device, known as user equipment (UE).

Common goals in cellular wireless networks (such as 3GPP networks) include efficient use of licensed bandwidth as well as increased coverage and throughput. One way to improve performance with respect to these goals is through the offloading of communication flows for a UE or other wireless mobile device to other available networks. For example, traffic may be offloaded to wireless local area network (WLAN) or other networks, such as Wi-Fi networks, WiMAX networks, or the like. These other networks may provide coverage where 3GPP networks, or other cellular networks, are not available, such as in coverage gaps or indoors. Additionally, because some of the traffic is offloaded to another network, bandwidth on the 3GPP network may be freed up for use by other devices and the load on the 3GPP network may be reduced. In one embodiment, other networks may be capable of providing greater data rates than the 3GPP network and may result in better throughput for the UE and/or better quality of service.

Offloading to Wi-Fi and/or Wi-MAX networks can significantly improve data rates and quality of service in 3GPP networks, in part because networks belonging to other entities may be used. For example, Wi-Fi networks maintained or owned by a hotel, store, or other venue may be used to route 3GPP traffic. This may provide much needed coverage in locations where 3GPP coverage may not be available. For example, interior spaces within buildings often have poor 3GPP reception. In some situations, providers of Wi-Fi or WiMAX networks can enter licenses with telecommunication companies, individuals, or other entities to provide communication services for 3GPP (or other cellular service) in order to bring in alternate forms of income.

In order to route traffic over alternate networks, a UE must select one or more available networks over which to route traffic. However, WLAN network selection in dual mode 3GPP compatible devices can result in conflicting sets of rules. Specifically, WLAN network selection may be based on information provided in an interworking WLAN (I-WLAN) management object (MO) specified in 3GPP Technical Specification (TS) 24.235 version 11.1.0 (2012-11-16), information provided in the access network discovery and selection function (ANDSF) MO specified in 3GPP TS 24.312 version 11.4.0 (2012-10-08), and/or information in the subscription MO as defined by the Wi-Fi Alliance (WFA) Hotspot 2.0 (HS2.0) Release 2 specifications, all of which are available to the public. For example, both the I-WLAN MO and the ANDSF MO may include operator controlled lists, user preferred lists, and home public land mobile network (HPLMN) controlled lists of preferred networks. The preferred networks may include preferred public land mobile networks (PLMNs) or service set identifiers (SSIDs) for preferred access networks. Since some of the information for WLAN network selection overlaps between the different MOs, conflicts and/or confusion can result in how to consistently select a WLAN access network.

Additional issues include complications regarding which procedures to apply during WLAN network selection. For example, the I-WLAN procedures may be applicable to initial network selection at I-WLAN UE switch on and following recovery from lack of WLAN radio coverage. However, it's not clear if these procedures are applicable during other cases which trigger WLAN network selection. Lack of a consistent set of procedures which can be applied for WLAN network selection across different trigger conditions results in unneeded complication.

Further issues include that the I-WLAN procedures fail to take into account rich sets of ANDSF and HS2.0 policies for intelligent WLAN network selection. Furthermore, if active policies governing WLAN network selection are changed, the I-WLAN procedures are not designed to reconsider new WLAN access networks and additional trigger points for I-WLAN network selection need to be defined.

The present application discloses a single MO that includes consolidated WLAN network selection information within the single MO, such as within the ANDSF MO. For example, the ANDSF MO may be enhanced to include all information for network selection, including WLAN network selection, to eliminate overlap and potential conflict of information. The consolidation of this information may simplify network selection for the UE, network, and/or users of the UE. In one embodiment, the ANDSF MO is enhanced to include policy elements or parameters specified in HS2.0 specifications such as time of day, location, venue, access network type, load on network, or the like for intelligent WLAN network selection.

The present application also discloses network selection procedures based on an ANDSF MO that includes the consolidated information. In one embodiment, the network selection procedure is independent of I-WLAN procedures as described in 3GPP TS 23.234 and 3GPP TS 24.234. For example, the I-WLAN procedures as described may not be used. Network selection independent of the I-WLAN MO and/or the procedures may enable operators that do not desire to deploy I-WLAN and provide I-WLAN configuration information to the UEs to still provide information to the UE to perform the selection of the appropriate PLMN or service provider. In one embodiment, the solution designed for WLAN network selection may work independently of the mechanisms used to gain connectivity to the 3GPP core network (such as the S2a, S2b, and/or S2c interfaces).

In one embodiment, a UE includes a communication component, a rules component, and a network selection component. The communication component may be configured to communicate over a 3GPP network and a non-cellular network. The rules component may be configured to store an ANDSF MO that includes WLAN selection policies for network selection on the UE. The WLAN selection policies may include I-WLAN policies and access network query protocol (ANQP) parameters. The network selection component is configured to select an available WLAN based on the ANDSF MO.

FIG. 1 is a schematic diagram of a communication system 100 for providing wireless communication services to a UE 102 or other mobile wireless device. The system 100 includes a plurality of RANs 104-112 through which the UE 102 may access IP services 114 or other data services, such as voice services or the Internet. Specifically, the system 100 includes a global system for mobile communications (GSM) enhanced data rates for GSM evolution (EDGE) RAN (GERAN) 104, a UTRAN 106, and an E-UTRAN 108, which provide access to communication services through a core network 116.

The system 100 also includes trusted and untrusted Wi-Fi RANs 110 and a WiMAX RAN 112, which connect to the core network 116 via a wireless access gateway (WAG) 118, a trusted WAG (TWAG) 120, and an access service network gateway (ASN-GW) 122, respectively. The Wi-Fi RANs 110 may include WLANs that implement 802.11a, 802.11g, 802.11n, 802.11ac, and/or any other 802.11 radio access technology (RAT). The WiMAX RAN 112 may implement any version of the 802.16 RAT (e.g. 802.16e or other 802.16 version). Each of the RANs 104-112 includes one or more base stations or other infrastructure for wirelessly communicating with the UE 102 and providing access to communication services. For example, the E-UTRAN 108 includes one or more eNBs, which are configured to wirelessly communicate with the UE 102.

The core network 116 includes a serving gateway (SGW) 124, a packet data network (PDN) gateway (PGW) 126, an ANDSF server 128, and an enhanced packet data gateway ePDG 130. The PGW 126 is connected to the WAG 118 via the ePDG 130 using the S2b interface (for the case of untrusted access) and to the TWAG 120 and ASN-GW 122 using the S2a interface (for the case of trusted access). In one embodiment, the core network 116 may include an evolved packet core (EPC). One of skill in the art will recognize that numerous other components and functions may be included or implemented in the core network 116.

The ANDSF server 128 is configured to assist the UE 102 to discover and connect to non-3GPP access networks, such as the Wi-Fi RAN 110 and/or the WiMAX RAN 112. The ANDSF server 128 stores an ANDSF MO that includes policies for selecting a 3GPP or an alternative access network, such as a WLAN access network. Policies within the ANDSF MO may indicate when connection to alternative networks is appropriate and/or when traffic offloading should be performed. In one embodiment, a cell of a cellular network (such as a cell of one of the 3GPP RANs 104, 106, 108) may have a corresponding list of Wi-Fi hotspots or WiMAX base stations in the same area. The UE 102 may use this list to connect to one of the available Wi-Fi hotspots or WiMAX base stations and/or route traffic over these connections.

Figure 2:
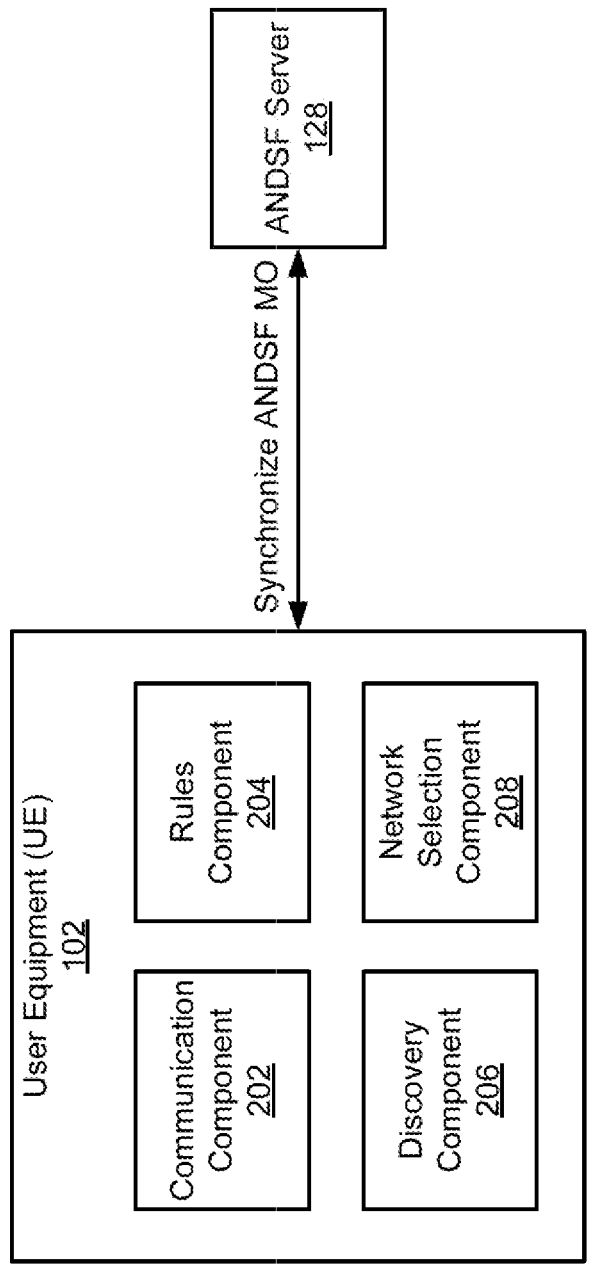
FIG. 2 is a schematic diagram illustrating user equipment (UE) and an access network detection and selection function (ANDSF) server for network selection consistent with embodiments disclosed herein.

FIG. 2 is a schematic block diagram illustrating example components of the UE 102. The UE 102, as depicted, includes a communication component 202, a rules component 204, a discovery component 206, and network selection component 208. The components 202-208 are given by way of example only. In some embodiments, additional or fewer components may be included. In fact, some embodiments may include only one or any combination of two or more of the illustrated components 202, 204, 206, 208.

The communication component 202 is configured to wirelessly communicate with other devices. In one embodiment, the communication component 202 may be configured to communicate data between the UE 102 and one or more base stations. For example, the communication component 202 may include a transceiver and/or an antenna for sending and receiving wireless signals to an eNB or other base station. In one embodiment, the communication component 202 allows the UE 102 to operate as a dual mode device. For example, the communication component 202 may include two or more radios configured to selectively or simultaneously communicate using two or more different communication standards. In one embodiment, the communication component 202 may be configured to communicate over a cellular network and/or a non-cellular network (such as a WLAN). Example network technologies include 3GPP, WiMAX, and Wi-Fi. According to one embodiment, the communication component 202 is configured to communicate data on behalf of the other components 204-208. For example, the communication component 202 may connect to or communicate data over a network selected by the network selection component 208.

The rules component 204 is configured to store rules or a set of rules for network selection. For example, the rules may include network selection policies such as WLAN network selection policies. In one embodiment, the rules component 204 stores an MO that includes policies and parameters controlling network selection. In one embodiment, the MO includes an ANDSF MO or any other MO that includes network selection policies or other rules or parameters for network selection.

In one embodiment, the rules component 204 stores an MO that includes consolidated network selection rules. For example, the MO may include all information required for WLAN network selection without referencing policies or parameters in another MO. In one embodiment, the ANDSF MO may be enhanced to include parameters and policies located or duplicated in other MOs. As an example the policy elements could be added in the inter-system routing policy (ISRP) and inter-system mobility policy (ISMP) sub-trees as extensions to the prioritized access descriptions for the case where the access technology is WLAN or in a new sub-tree, e.g. called a WLAN selection policy (WLANSP), in the ANDSF MO. The operator preferred list of WLAN service providers, such as PLMNs and work station identifiers (WSIDs), may be added under access technology specific branches.

In one embodiment, the ANDSF MO is enhanced to include a WLANSP node under which the network selection policies and parameters may be consolidated. For example, the WLANSP node may form the root of a WLANSP sub-tree in the MO separate from an ISMP and an ISRP. Similarly, another MO may be enhanced to include the consolidated network selection policies or a new WLANSP MO may be created including the consolidated policies and parameters. By consolidating the WLAN network selection policy elements and related information in a single MO, the overlap and potential conflicts in information can be resolved.

In one embodiment, the MO includes WLAN selection policies based on parameters of the HS2.0 Release 2 specification. In one embodiment, the HS2.0 specifications include or reference WLAN network selection policies or parameters as defined in the Subscription MO. In one embodiment, 3GPP may define additional WLAN network selection policies for dual mode devices based on ANQP parameters or additional information included in HS2.0 specifications. For example, the selection policies may be based on parameters that can be discovered from an HS2.0 access network. The ANQP may include policies and procedures which may be used by a UE to discover information about a Wi-Fi hotspot, such as information about the hotspot's operator, roaming partners, load, or the like. In one embodiment, the ANDSF MO as defined in TS 24.312 is enhanced to incorporate these additional policies based on HS2.0 specifications. For example, the WLAN network selection policies may be based on HS2.0 parameters such as a venue parameter, an access network type parameter, a backhaul load parameter, or any other policy elements or parameters in the HS2.0 specifications.

In one embodiment, the MO with consolidated network selection policies includes all I-WLAN policy parameters. The I-WLAN MO as defined in 3GPP TS 24.235 specifies policies for WLAN network selection. For example, the I-WLAN MO may define a home operator network ID, such as an SSID. Additionally, the I-WLAN MO may include operator controlled roaming partner priority lists, which may include realms, OUIs, SSIDs, or other identifiers. In one embodiment, a single MO, such as the ANDSF MO, may be enhanced to include these parameters from the I-WLAN MO.

In one embodiment, the MO includes preferences for specific service providers. The preferences for specific service providers may indicate specific networks or may indicate organizations or other entities that operate the networks. For example, the MO may include lists of preferred access networks based on SSIDs. Additionally or alternatively, the MO may include lists of preferred access networks based on network access identifier (NAI) realms, organizationally unique identifiers (OUIs), and/or other identifiers that identify a roaming consortium or service provider. For example, the list of preferred access networks may include any type of identifier that identifies the network as associated with an operator, a service provider, or other organization or group. In one embodiment, inclusion of realms and/or OUIs may allow a preferred network to be selected based on these identifiers and without a specific SSID for the preferred network. For example, each WLAN may have its own specific and/or unique identifier while the realms, OUIs, or other identifiers may be common to a plurality of networks. Thus, a network may be identified as a preferred network simply based on the group of networks to which it belongs or the service providers through which it may provide access.

In one embodiment, the preferences for specific service providers may be indicated in one or more lists. In one embodiment, an operator controlled list may be provisioned within an MO by an ANDSF server 128 or other network infrastructure component specifying preferred networks for the operator (such as the operator of a 3GPP network for which the UE 102 is activated). In one embodiment, the lists may include a user controlled list for networks that the user prefers. The user preferred networks may include networks to which a user has allowed the UE 102 to connect as well as service providers (which can be identified based on a corresponding OUI or realm) for which the user has a subscription. In one embodiment, the lists may include an HPLMN controlled list indicating preferences of the HPLMN for which the UE 102 is activated. The user controlled lists, operator controlled lists, and/or HPLMN controlled lists may include preferred WLAN service providers (such as PLMN5) or WSIDs.

Figure 3:
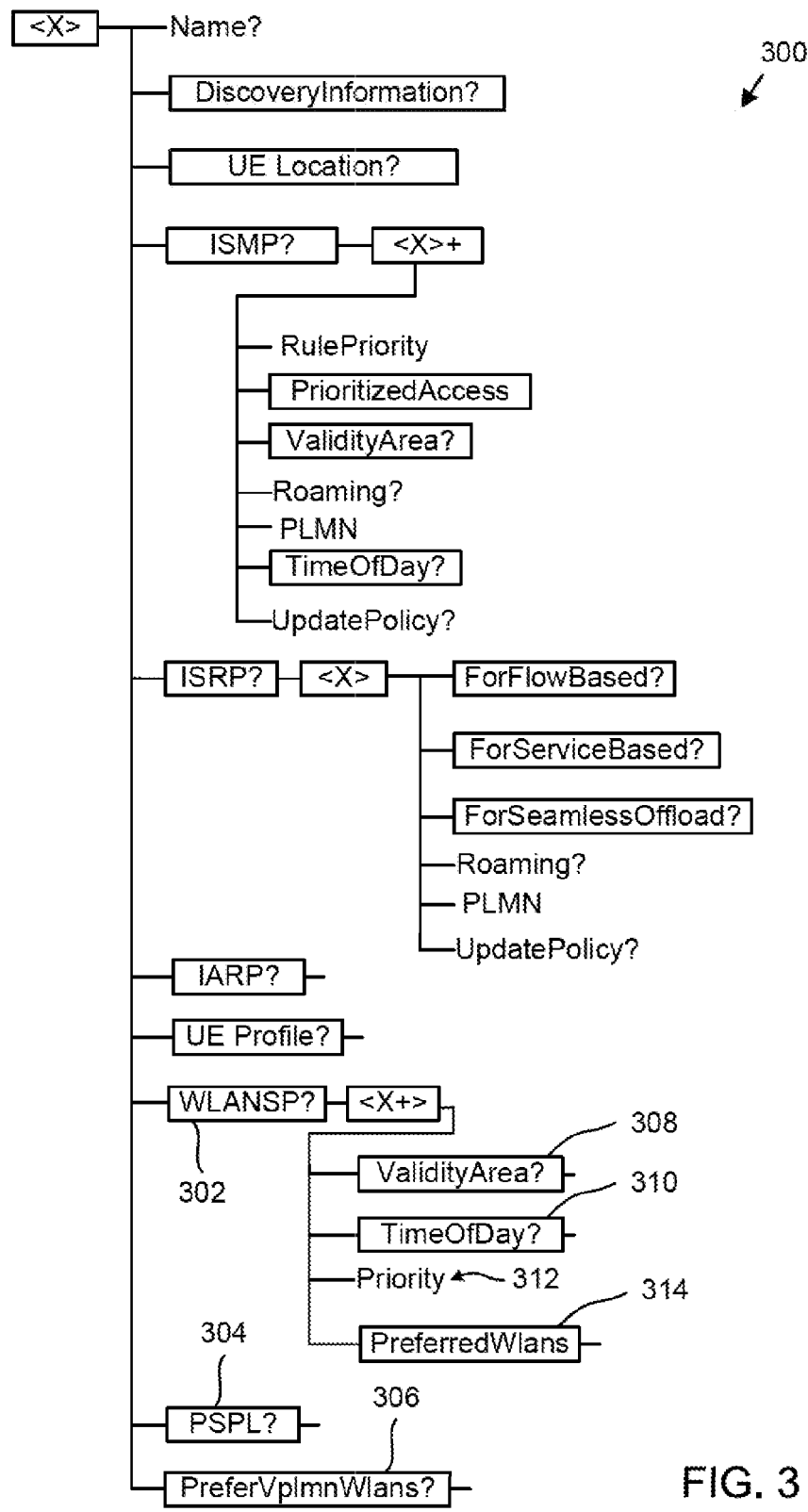
FIG. 3 is a schematic block diagram of an ANDSF management object (MO) consistent with embodiments disclosed herein.

FIG. 3 is a schematic diagram illustrating an ANDSF MO 300 that includes consolidated WLAN network selection policies and parameters. In one embodiment, an ANDSF MO 300 includes preferences in an XML format. For example, the policies and preferences may be organized in a branch and leaf structure. In one embodiment, each branch or leaf node may include values indicating preferences or policies for network selection. The ANDSF MO 300 includes a WLANSP? node 302, a preferred service provider list (PSPL)? node 304, and a PreferVplmnWlans? node 306. Only a portion of the ANDSF MO 300 is depicted for clarity of illustration and discussion. Although FIG. 3 illustrates WLAN selection policies and parameters in the ANDSF MO 300, any of the teaching discussed herein may be applied to other MOs, rule sets, or to a newly created MO.

The WLANSP? node 302 may form a root node of a WLANSP sub-tree of the ANDSF MO 302. For example, the 3GPP-defined policies for WLAN network selection may be organized within the WLANSP sub-tree in the ANDSF MO, separate from ISMP and ISRP. In one embodiment, the ISMP node, ISRP node, and internal sub-nodes remain unchanged but may include a prioritized list of 3GPP and WLAN access networks. In another embodiment, the policies may be distributed in the ISRP and ISMP sub-trees as extensions to the prioritized access descriptions for the case where the access network is a WLAN. In one embodiment, a selection of an active rule requires interaction between WLANSP, ISMP, and the ISRP nodes and sub-trees.

The WLANSP? sub tree may include a rules set that includes one or more WLANSP rules. In one embodiment, each WLANSP rule may specify a priority value, a set of validity conditions, and/or a list of preferred WLAN attributes. For example, the depicted WLANSP? node 302 includes sub-nodes 308, 310, 312 and 314 which may include leaf or branch nodes that specify values for the conditions, priorities, and/or preferred WLAN attributes of a rule. The ValidityArea? node 308 and TimeOfDay? node 310 may indicate validity conditions for when the rule should be applied. For example, the ValidityArea? node 308 or sub-nodes may define a geographical region in which the rule is valid and the TimeOfDay? node 310 or sub-nodes may define a time of day during which the rule is valid. The Priority node 312 may indicate a priority for the rule. For example, the Priority node 312 may include a value indicating a relative priority of the rule as compared to other rules. For example, rules with a higher priority may, if valid, be applied while lower priority rules may not be applied.

The PreferredWlans node 314 may include a list of preferred WLAN attributes for the rule. For example, the PreferredWlans node 314 may include a plurality of sub-nodes indicating one or more supported realms, a basic service set (BSS) load, one or more SSIDs, one or more OUIs, or the like. In one embodiment, the use of realms, OUIs, RoamingConsoriumOIs or the like allows for reduced maintenance of preferred WLAN lists. For example, the preferred WLAN policies may be based on realms and/or OUIs to indicate for example that "WLANs that interwork with Realm=PartnerX.com have the highest access priority". The UE 102 may use the realms and/or OUIs as an alternative way (instead of using SSID) to identify and prioritize the discovered WLAN access networks. In one embodiment, the realms, OUIs or other identifiers are supported by HS2.0 compliant WLAN access networks.

In one embodiment, a WLANSP rule or other parameter in the WLANSP sub-tree may include parameters or policies from the HS2.0 specification (such as policies from the Subscription MO). In one embodiment, a WLANSP sub-tree or rule within the sub-tree may be based on one or more of a PreferredRoamingPartnerList parameter, a PreferredRoamingPartnerList parameter, a MinimumBackhaulThreshold parameter, a MinimumBackhaulAvailableBandwidthThreshold parameter, a MaximumBSSLoad parameter, a BSSLoadThreshold parameter, a SPExclusionList parameter, a RequiredProtoPortTuple parameter, or any other HS2.0 parameter or node. To address location related information, policies related to WLAN access network type, venue information and connection capability may be included in the ANDSF MO. The connection capabilities of the WLAN network may be advertised to proximal UE 102. In one embodiment, a UE 102 may query a WLAN access network to obtain values for one or more of the above parameters corresponding to the WLAN access network. The WLANSP sub-tree may also include 3GPP specific sub-nodes which specify requirements for WLAN selection.

The PSPL? node include sub-nodes and/or information including a list of service providers preferred by the home operator. These service providers may support authentication, authorization, and accounting (AAA) interworking with the HPLMN and can be used to authenticate the UE with the extensible authentication protocol method for universal mobile telecommunication system (UMTS) authentication and key agreement (EAP-AKA). The UE 102 uses the PSPL node 304 and/or sub-nodes to identify whether a 3GPP service provider is an equivalent HPLMN or a 3GPP roaming partner. The PSPL node 304 and/or sub-nodes may also contain a policy whether or not a UE prefers the 3GPP registered PLMN (RPLMN) also for WLAN access.

The PreferVplmnWlans node 306 and/or sub-nodes may contain a list of PLMNs. In one embodiment, when the UE 102 is roaming to one of these PLMNs, the UE 102 is configured to prefer WLAN access networks policies provided by this visited PLMN (VPLMN) over the WLANs provided by the HPLMN. When the UE 102 is roaming to any other PLMN, the UE 102 may be configured to prefer WLAN access networks policies provided by the HPLMN.

Returning to FIG. 2, the discovery component 206 is configured to discover a set of available WLAN access networks. In one embodiment, the discovery component 206 discovers access networks using a radio or antenna of the communication component 202. In one embodiment, the discovery component 206 discovers the WLAN access networks based on SSIDs, realms, OUIs, or other identifiers within an MO or rule set stored by the rules component 204. In one embodiment, the discovery component 206 discovers WLAN access networks that are within range of the UE 102 and that meet one or more restrictions of the ANDSF MO. For example, the discovery component 206 may search for SSIDs, realms, OUIs or other identifiers based on a current geographical location of the UE 102, time of day, or any other parameters specified by the ANDSF MO 300.

The discovery component 206 may discover parameters, capabilities, or the like of a WLAN network based on HS2.0 specifications. For example, the discovery component 206 may discover roaming relationships, loads on a specific WLAN access network, or the like. Any of the parameters of the HS2.0 may be discovered by the discovery component 206. In one embodiment, the discovery component 206 may query a proximal WLAN access network using ANQP to discover parameters listed within the ANDSF MO 300. For example, based on information in IEEE 802.11 beacons and using ANQP procedures, the discovery component 206 discovers the RoamingConsortiums lists and/or NAI Realm lists which identify service providers whose services can be accessed using the WLAN access network and whose credentials can be used for authentication. In one embodiment, the discovery component 206 compiles a list of available WLAN access networks and/or associated parameters and information for evaluation during network and/or service provider selection.

The network selection component 208 is configured to select an available WLAN access network based on WLAN selection policies. For example, the network selection component 208 may select a WLAN network based on one or more of the rules and policies within the ANDSF MO, such as the ANDSF MO 300 of FIG. 3. In one embodiment, the WLAN network selection is driven by the HPLMN. For example, in roaming scenarios the home ANDSF policies may take precedence over visited ANDSF policies. In one embodiment, this preference for HPLMN or VPLMN policies can be determined based on reference to the PreferVplmnWlans? node 306 of the ANDSF MO 300. The preference for HPLMN or VPLMN can be indicated by an operator, user, or the HPLMN, for example.

In one embodiment, the network selection component 208 determines one or more currently valid rules or policies. For example, the network selection component 206 of the UE 102 may evaluate the conditions (such as a location or time condition) to determine whether a rule in the WLANSP? node 302 branch, or any other location within an MO, is valid. In one embodiment, the network selection component 206 determines which WLANSP rules are valid and selects one or more of these valid rules to apply. For example, rules with the highest priority (which may be indicated by the Priority node 312) may be applied to a list of WLAN access networks discovered by the discovery component 204.

In one embodiment, the network selection component 208 may prioritize a list of available WLAN access networks based on an active WLANSP rule. For example, WLAN access networks that better match the WLANSP rule or meet more requirements of the active WLANSP rule may be listed with a higher priority than WLAN access networks which do not meet the requirements. In one embodiment, the network selection component 208 may prioritize the list of available WLAN access networks based on HS2.0 parameters. For example, the network selection component may prioritize the WLANs based on a venue, a network load, an available backhaul bandwidth, and a lists of preferred SSIDs, OUIs, realms, or the like.

The network selection component 208 may prioritize the list based on service providers that are available on each of the available access networks. In one embodiment, the network selection component 208 may prioritize the list using HS2.0 or other parameters and then compares the list of available WLANs with the preferred WLANs based on WLANSP rules and selects the WLAN with the highest priority. For example, the network selection component 208 may compare a list of preferred networks to the list of available networks. In one embodiment, a user controlled list, operator controlled list, HPLMN controlled list or other list of preferred service providers may be used to prioritize the networks. The service provider policies may be located within an MO (such as the AND SF MO) and/or within a universal subscriber identity module (USIM) such as a USIM card. In one embodiment, if there are multiple WLANs with the same highest priority, the network selection component 208 selects the WLAN that interworks with the most preferred service provider in the PSPL sub tree (under the PSPL? node 304 of FIG. 3).

The network selection component 208 may select a most preferred WLAN access network. For example, the network selection component 208 may select an access network with a highest priority from the prioritized list of networks. In one embodiment, a network is selected based on network attributes other than service providers that are available through a network. For example, the network selection component 208 may select an WLAN access network based on HS2.0 parameters, preferred networks lists, or the like and then select a service provider from the available service providers corresponding to the selected WLAN access network. In one embodiment, the network selection component 208 may take HS2.0 parameters and service providers into account when prioritizing the network and then select a highest priority network. The network selection component 208 may initiate authorization with a service provider corresponding to the selected network and the communication component 202 may route traffic flows over the selected network using the selected service provider.

In one embodiment, the network selection component 208 may select a WLAN network based on ISRP and/or ISMP policies within the ANDSF MO. For example, the network selection component 208 may prioritize a list of available access networks using the WLANSP sub-tree of the ANDSF MO and then apply the ISRP and/or ISMP in order to make a network selection. In one embodiment, the ISRP and/or ISMP area applied after an initial network selection or are used to determine what traffic is routed over the selected network.

In one embodiment, the network selection component 208 is configured to select a WLAN access network during initial network selection. For example, the network selection component 208 may not need to wait until a PLMN is selected using a 3GPP communication standard in order to select a WLAN. In one embodiment, the WLAN may be used to communicate traffic flows that are normally directed over a 3GPP network (such as voice traffic flows or control traffic) when a 3GPP network is unavailable. In one embodiment, the network selection component 208 may use the ANDSF MO to select the access network during initial network selection. According to one embodiment, the network selection procedures performed by the network selection component 208 utilizes WLAN MO settings prior to or during WLAN network selection. This may allow the preferences specified in the ANDSF rules to initially select or reselect a network and/or trigger the UE to initially select or to reselect another WLAN access network (such as a network in a different PLMN).

The ANDSF server 128 is configured to store and provide network selection and/or routing rules to the UE 102. In one embodiment, the ANDSF server 128 is configured to synchronize an ANDSF MO with the UE 102 at activation or in a dynamic manner. In one embodiment, the ANDSF server 128 stores an ANDSF MO (such as the ANDSF MO 300 of FIG. 3) indicating network selection rules for a UE 102. In one embodiment, the ANDSF server 128 may store multiple ANDSF MOs for different UEs 102 and/or for different types of UEs 102. The ANDSF MO may include a WLAN selection policy or other rules or policies for controlling network selection. The ANDSF MO may be open mobile alliance (OMA) device management (DM) compliant.

In one embodiment, the ANDSF server 128 is configured to establish communication with a UE 102. For example, the ANDSF server 128 may receive a request from a UE 102 to connect and update an MO for the UE 102. In one embodiment, the UE 102 may request updating of the MO in response to the ANDSF server 128 indicating that the MO has changed.

The ANDSF server 128 may synchronize at least a portion of the ANDSF MO with the UE 102. For example, the ANDSF server 128 may synchronize at least a portion of the MO that includes a WLANSP branch of the MO. In one embodiment, the ANDSF server 128 may only provide portions of the ANDSF MO that are different from an ANDSF MO stored by the UE 102. In one embodiment, the ANDSF MO includes network selection rules that include identifiers indicating service provider preferences. For example, the service provider preferences may include an SSID, an OUI, an NAI realm, a roaming consortium, or any other service provider identifier.

Example WLAN Selection Based on WLANSP Rules within the ANDSF MO

Following is an example implementation of network selection policies and parameters, according to one embodiment. One of skill in the art will recognize that numerous variations and embodiments are within the scope of the present disclosure and are not limited to this example.

This example discloses an ANDSF MO that includes a set of rules and describes how a UE uses selects a most preferred WLAN access network based on the rules. The ANDSF MO includes a number of nodes and/or information that contain the rules and selection policies. A PSPL node is included in the ANDSF MO that contains a list of service providers preferred by the home operator. These service providers support AAA interworking with the HPLMN and can be used to authenticate the UE with EAP-AKA. In one embodiment, this node is included only by the home ANDSF. A PreferVplmn-Wlans node is included in the ANDSF MO that can contain a list of PLMNs. When the UE 102 is roaming to one of these PLMNs, the UE is configured to prefer WLAN access networks policies provided by the VPLMN over the WLANs provided by the HPLMN. When the UE is roaming to any other PLMN, the UE is configured to prefer WLAN access networks policies provided by the HPLMN. A WLANSP node is include in the ANDSF MO. This node includes one or more WLANSP rules, each one specifying a priority value, a set of validity conditions and list of a preferred WLAN attributes (such as supported realms, BSS load, SSIDs, OUIs, etc.). The UE determines which WLANSP rules are valid and selects one of these valid rules to apply. The applied WLANSP rule is used by the UE to select the most preferred WLAN access network.

The Policy node (ISMP) in the ANDSF MO remains unchanged and includes a prioritized list of 3GPP and WLAN access networks, e.g.: WLAN-A priority 1, 3GPP priority 2, WLAN-B priority 3. This prioritized list can be used to define the relative priority of 3GPP access with respect to WLAN access or with respect to certain WLAN access networks. If the prioritized list of access networks in an ISMP rule include only WLAN access networks, this list is not used since WLAN selection is based on WLANSP only. The ISRP node and the internal "ForFlowBased", "ForServiceBased" and "ForNonSeamlessOffload" nodes in the ANDSF MO remain unchanged. So, the ISRP rules for IP flow mobility (IFOM) and for multiple-access PDN connectivity (MAPCON) can still include a prioritized list of 3GPP and WLAN access networks, e.g.: WLAN-A priority 1, 3GPP priority 2, WLAN-B priority 3. This prioritized list can be used to define the relative priority of 3GPP access with respect to WLAN access or with respect to certain WLAN access networks.

If the prioritized list of access networks in an ISRP for IFOM rule or in an ISRP for MAPCON rule include only WLAN access networks, this list is not used for WLAN selection since WLAN selection is based on WLANSP only. The list is still used by the UE to make IP traffic routing decisions. The prioritized list of access networks in an ISRP for non-seamless WLAN offloading (NSWO) rule is not used since WLAN selection is based on WLANSP only. The list is still used by the UE to make IP traffic routing decisions. It is assumed that the active ISMP/ISRP rule in the UE can always be used to determine the relative priority of the most preferred WLAN (selected based on the active WLANSP rule) over 3GPP access.

A UE may be provisioned with multiple valid ISMP, ISRP and WLANSP rules. Out of all these valid rules the UE selects and applies only two rules: one WLANSP rule and either one ISMP or one ISRP rule. A rule applied by the UE is called an "active" rule. Specifically, a UE that cannot simultaneously route IP traffic over multiple radio accesses selects an active ISMP rule and an active WLANSP rule while a UE that can simultaneously route IP traffic over multiple radio accesses selects an active ISRP rule and an active WLANSP rule.

When the UE is not roaming, it selects the active ISMP/ISRP rule and the active WLANSP rule to apply from the valid rules provided by the HPLMN based on the individual priorities of these rules (or based on other criteria). For example, the highest priority valid WLANSP rule is selected as the active WLANSP rule.

When the UE is roaming, it may have valid rules from both HPLMN and VPLMN. In this case, the UE is configured to either prefer WLAN access networks policies provided by the HPLMN or not. This configuration can be done either by the user or by the home ANDSF via the PreferVplmnWlans node. User configuration takes precedence over the home ANDSF configuration. If the UE is configured not to prefer WLAN access network policies provided by the HPLMN (i.e. the VPLMN to which the UE is registered is included in the PreferVplmnWlans node), then the UE selects the active WLANSP rule and the active ISMP/ISRP rule from the valid rules provided by the VPLMN. If the UE is configured to prefer WLAN access networks policies provided by the HPLMN (i.e. the VPLMN to which the UE is registered is not included in the PreferVplmnWlans node), then the UE checks the WLANSP rule provided by the HPLMN and determines if any of the WLAN access networks in this rule are available. If at least one of these WLAN access networks is available, or becomes available, then the UE selects/reselects the active WLANSP rule and the active ISMP/ISRP rule from the valid rules provided by the HPLMN (e.g. based on their priority values). If none of these WLAN access networks is available, then the UE selects the active WLANSP rule and the active ISMP/ISRP rule from the valid rules provided by the VPLMN.

During power-up while UE has not registered to any PLMN, the UE considers the WLANSP rules provided by the HPLMN as valid and selects an active WLANSP rule as described above (e.g. the one with the highest priority). Thus during power-up the UE can select a WLAN network based on the WLANSP rules provided by HPLMN.

After the UE selects an active ISMP/ISRP rule and an active WLANSP rule as described above, the active rules may interact to select a network. If the UE selects an active ISMP rule because it cannot simultaneously route IP traffic over multiple radio accesses, the UE uses the active ISMP rule to determine if EPC connectivity is preferred over WLAN access or over 3GPP access. If EPC connectivity is preferred over WLAN access (i.e. the highest priority access in the active ISMP rule corresponds to WLAN access technology), the UE uses the active WLANSP rule to determine the most preferred available WLAN access network.

If the most preferred available WLAN access network has higher priority than 3GPP access (according to the prioritized accesses in the active ISMP rule), then the UE connects to EPC over the most preferred available WLAN access network. Otherwise, the UE connects to EPC over 3GPP access. For example, if the prioritized access networks in the active ISMP rule are the WLAN-A priority 1, 3GPP priority 2, WLAN-B priority 3, then the UE determines that EPC connectivity is preferred over WLAN access because a WLAN access network (WLAN-A) has higher priority than 3GPP access. Subsequently, the UE uses the active WLANSP rule to determine the most preferred available WLAN access network. If the most preferred available WLAN access network has lower priority than 3GPP access (e.g. WLAN-B), then the UE connects to EPC over 3GPP access. If the most preferred available WLAN access network has higher priority than 3GPP access (e.g. WLAN-A), then the UE connects to EPC over most preferred available WLAN access network.

If the UE selects an active ISRP rule because it can simultaneously route IP traffic over multiple radio accesses, the UE uses the active WLANSP rule to select and connect to the most preferred available WLAN access network. If an IP flow matches an active ISRP for IFOM rule which contains a prioritized list of access networks, then the UE determines if the selected WLAN access network has higher priority than 3GPP access and routes the IP flow accordingly. For example, the prioritized access networks in the active ISRP for IFOM rule are WLAN-A priority may be 1, 3GPP priority 2, WLAN-B priority 3. Thus, if the UE has selected WLAN-B (or any WLAN network with lower priority than 3GPP access), it routes the IP flow over 3GPP access. If the UE has selected WLAN-A (or any WLAN network with higher priority than 3GPP access), it routes the IP flow over WLAN access.

If the UE attempts a PDN connection establishment for an access point name (APN) that matches an active ISRP for MAPCON rule and if this rule contains a prioritized list of access networks, then the UE determines if the selected WLAN access network has higher priority than 3GPP access and establishes the PDN connection accordingly. For example, if the prioritized access networks in the active ISRP for MAPCON may be WLAN-A priority 1, 3GPP priority 2, WLAN-B priority 3. Based on the foregoing, if the UE has selected WLAN-B (or any WLAN network with lower priority than 3GPP access), it establishes the PDN connection over 3GPP access. If the UE has selected WLAN-A (or any WLAN network with higher priority than 3GPP access), it establishes the PDN connection over WLAN access. If an IP flow matches an active ISRP for NSWO rule the UE routes this IP flow over the selected WLAN access network.

The UE uses the active WLANSP rule to select the most preferred available WLAN access network and then performs EAP-AKA/EAP-AKA' authentication over this WLAN access network (if EAP-AKA/EAP-AKA' authentication is needed). This WLAN selection is performed by the UE discovering the available WLANs and placing them in priority order based on the active WLANSP rule. For example, the priority may result in WLAN-1 (priority 1), WLAN-4, WLAN-2 (priority 2), and WLAN-3 (priority 3). Then, the UE selects the WLAN with the highest priority (best match), e.g. WLAN-1. If there are multiple WLANs with the same highest priority, the UE selects the WLAN that interworks with the most preferred service provider in the PSP list. Finally, for EAP-AKA//EAP-AKA' authentication (if needed) the UE determines from the PSP list which preferred service providers interwork with the selected WLAN and constructs a NAI that corresponds to the most preferred service provider. For example, NAI=<real_of_hplmn>!<IMSI>@<real_of_PSP-A>, if PSP-A is the most preferred service provider that interworks with the selected WLAN.

It is noted that the EAP-AKA//EAP-AKA' authentication is only required when the UE decides to connect to the most preferred WLAN access network. The UE performs the WLAN selection based on the active WLANSP rule (as described above) without taking into account real-time events associated with the active ISRP rule. The active ISRP rule is used only for routing decisions and does not impact the selection or reselection of the WLAN access network. For example, when a new IP flow in the UE matches the traffic selector in the active ISRP rule, this event should not trigger WLAN re-selection. If the conditions for WLAN selection change every time a new application runs or when certain IP flows are detected, the WLAN selection in the UE will be complex and may lead to frequent WLAN re-selections that would negatively affect the user experience and the battery consumption. Events such as change of WLAN load information, change of UE location, change of time of day may lead to WLAN (re-)selection based on the WLANSP rule.

The Preferred Service Providers List (PSPL) contains a list of 3GPP service providers preferred by the UE's 3GPP home operator. As specified above, this list is used by the UE (i) to construct a NAI when it attempts EAP-AKA/EAP-AKA' authentication over a selected WLAN access network and (ii) to select a WLAN access network when there are multiple WLANs available that best match the preferences in the active WLANSP rule. The PSPL contains 3GPP Service providers that can be identified as realms, possibly with the domain name derived from a PLMN identifier (ID). This allows a UE to select the preferred 3GPP service provider to authenticate with upon selecting WLAN based, among other information, on the list of 3GPP service providers that the UE may discover from the WLAN AP, e.g. by means of HS2.0 ANQP query if the AP is HS2.0 capable.

The UE uses the PSPL to identify whether a 3GPP service provider is an equivalent HPLMN or a 3GPP roaming partner. The PSPL also contains a policy whether or not a UE prefers the 3GPP RPLMN also for WLAN access. If the policy is set to "prefer 3GPP RPLMN" and the active ANDSF rule is provided by the 3GPP RPLMN, the UE selects the 3GPP RPLMN (or a PLMN equivalent to 3GPP RPLMN) as the PLMN selected for WLAN access. If the active ANDSF rule is provided by another PLMN than the current 3GPP RPLMN, or the policy is not set, the UE uses the PSPL as described above. The PSPL is always provided by the HPLMN through a home ANDSF or can be statically provisioned in the UE. The UE shall ignore the PSPL information provided by the visited ANDSF, if any. If the UE has both an MO from the visited ANDSF and the home ANDSF, the UE uses only the PSPL of the home ANDSF MO.

Turning now to FIGS. 4-7, methods for WLAN network selection are provided. FIG. 4 is a schematic flow chart diagram illustrating a method 400 for network selection. The method 400 may be performed by a UE 102 or other mobile wireless device.

The method 400 begins and a UE 102 configured to communicate over a 3GPP network and a non 3GPP network is provided 402. The UE 102 may include a communication component 202 that include two or more radios. For example, one radio may be configured to communicate over a 3GPP network and another radio may be configured to communicate over a non-cellular network, such as a WLAN.

A rules component 204 stores 404 an ANDSF MO that includes WLAN selection policies. In one embodiment, the WLAN selection policies include I-WLAN policies and ANQP parameters. For example, the I-WLAN policies may include policies for selecting a WLAN capable of I-WLAN. The ANQP parameters may include parameters or values obtained through ANQP procedures. In one embodiment, the ANQP parameters may include parameters or values based on the HS2.0 Release 2 specification.

A network selection component 208 selects 406 an available WLAN access network based on the WLAN selection policies of the ANDSF MO. For example, the network selection component 208 may select 406 the WLAN based on the ANDSF MO as discussed above. In one embodiment, the network selection component 208 selects 406 a WLAN previous to connecting to any PLMN. For example, the network selection procedures used by the network selection component 208 to select 406 the WLAN access network may be performed after boot up, during initial network selection, and/or if a 3GPP access network is unavailable.

FIG. 5 is a schematic flow chart diagram illustrating a method 500 for WLAN selection. The method 500 may be performed by a UE 102 or other wireless mobile device. The UE 102 may be configured to communicate with an eNB in a 3GPP LTE or LTE advanced LTE-A network as well as a WLAN.

The method 500 begins and a discovery component 206 discovers 502 a set of available WLAN access networks. The discovery component 206 may discover 502 the WLAN access networks based on a single rule set stored by the rules component 204. For example, the single rule set may include a single MO such as the ANDSF MO.

A network selection component 208 prioritizes 502 the available WLAN access networks based on WLAN selection policies within the single rule set. For example, a list of available WLAN access networks may be prioritized 502 based on HS2.0 parameters within the single rule set. These parameters may include location, time of day, network load, or other parameters. Any other parameters or rules discussed herein may also be used to prioritize 502 the WLAN access networks. For example, operator controlled, HPLMN controlled, and/or user controlled lists of preferred networks and/or service providers may be used by the network selection component 208 to prioritize 502 the WLAN access networks.

The network selection component 208 selects 506 a WLAN access network with the highest priority. For example, the network selection component 208 may select the highest priority WLAN access network after the prioritizing 504 the WLAN access networks. In one embodiment, if there are two access networks with a same highest priority, the network selection component 208 may select 506 the WLAN access network with a most preferred service provider.

FIG. 6 is a schematic flow chart diagram illustrating a method 600 for WLAN selection. The method 600 may be performed by a UE 102 or other wireless mobile device.

The method 600 begins and the network selection component 208 prioritizes 602 available WLAN access networks based on a consolidated WLAN selection policies (within e.g., WLANSP? node 302) within a single MO. For example, the network selection component 208 may select 602 a WLAN access network based on an ANDSF MO with consolidated network selection policies including I-WLAN selection polices and/or HS2.0 parameters. In one embodiment, the single MO may include a PSPL (e.g., the PSPL? node 304).

In one embodiment, the network selection component 208 prioritizes 602 the available WLAN access networks by comparing their attributes and/or capabilities against the groups of selection criteria in an active WLANSP rule. For example, the WLAN access networks that match the group of selection criteria with the highest priority are considered as the most preferred WLANs and the WLAN access networks that match the group of selection criteria with the second highest priority are considered as the second most preferred WLANs, etc. The network selection component 208 performs the WLAN network selection based on the active WLANSP rule.

The network selection component 208 selects 604 a highest priority WLAN access network that interworks with a most preferred service provider in a PSPL. For example, the network selection component 208 may select 604 a WLAN access network with a highest priority based on how the network selection component 208 prioritizes 602 the available WLAN access networks. If there are multiple highest priority WLAN access networks (multiple WLAN access networks with a same highest priority), then the network selection component 208 selects 604, for example, the highest priority WLAN access network that interworks with a service provider higher up in the PSPL, or other list. The network selection component 208 may compare available service providers to a list of alternate network identifiers such as realms, OUIs, roaming consortium IDs to select 604 a highest priority service provider.

The communication component 202 authenticates 606 the UE 102 using an NAI based on the PSPL. For example, the communication component 202 may authenticate 606 the UE 102 with a PLMN using EAP-AKA/EAP-AKA' authentication. The information for authentication may be included within the PSPL. The PSPL may include a list of preferred WLANs controlled by an HPLMN, VPLMN, or the like.

The communication component 202 communicates 608 3GPP traffic over the selected 602 WLAN access network. For example, the communication component 202 may route IP traffic over the WLAN access network.

FIG. 7 is a schematic flow chart diagram illustrating a method 700 for synchronizing network selection rules with a UE 102. The method 700 may be performed by an ANDSF server 128 or other network infrastructure component.

The method 700 begins and the ANDSF server 128 stores 702 an ANDSF MO that includes network selection rules for a UE 102 or other mobile wireless device. The ANDSF MO may include one or more service provider identifiers for identifying preferred networks. In one embodiment, the ANDSF MO stored 702 by the ANDSF server 128 may include rules based on realms, OUIs, roaming consortium IDs, or other network identifiers or service provider identifiers.

The ANDSF server 128 establishes 704 communication with a UE 102. The UE 102 may include a UE 102 within a geographic area corresponding to the ANDSF server 128. The ANDSF server 128 synchronizes 706 at least a portion of the ANDSF MO with the UE 102. For example, the UE 102 may store a copy of the MO at the UE 102. The ANDSF server 128 may synchronize 706 the ANDSF MO with the UE 102 in response to an update or change being made to the ANDSF MO. In one embodiment, the portion of the ANDSF MO synchronized with the UE 102 includes preferences for access networks corresponding to a preferred service provider. The ANDSF MO may indicate preferred services providers based on an SSID, realm, OUI, or other identifier.

Figure 8:
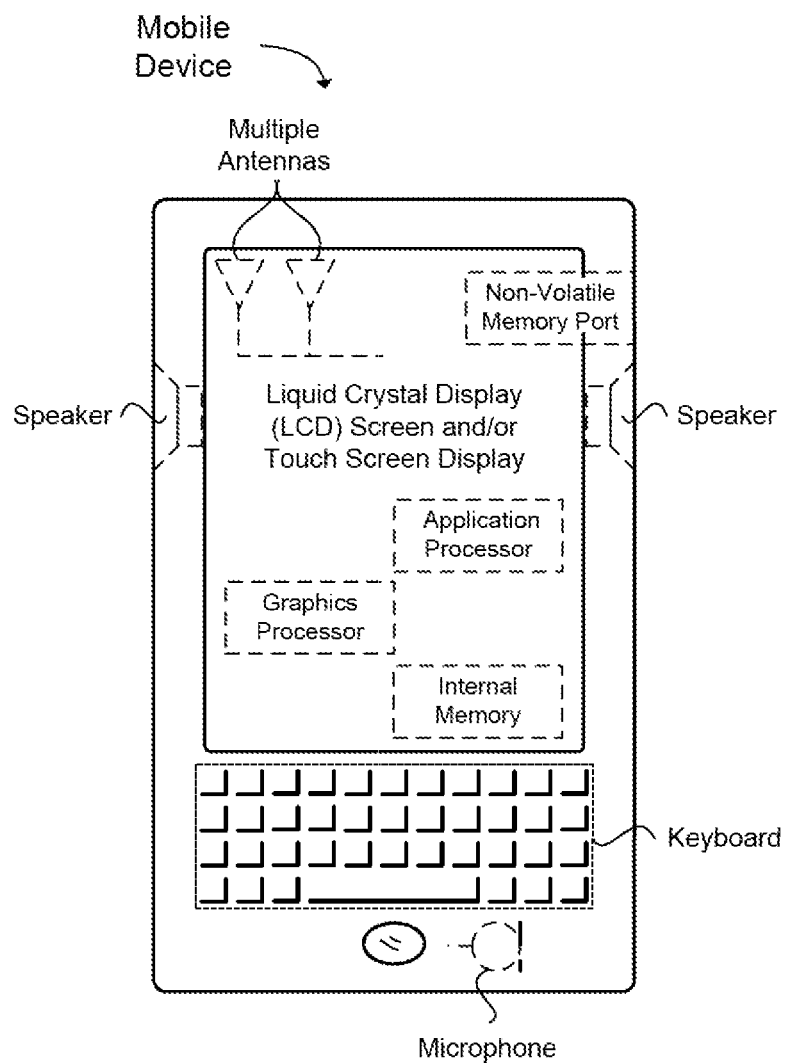
FIG. 8 is a schematic diagram of a mobile device consistent with embodiments disclosed herein.

FIG. 8 is an example illustration of a mobile device, such as a UE, a mobile station (MS), a mobile wireless device, a mobile communication device, a tablet, a handset, or another type of mobile wireless device. The mobile device can include one or more antennas configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard including 3GPP LTE, WiMAX, HSPA, Bluetooth, and Wi-Fi. The mobile device can communicate using separate antennas for each wireless communication standard or shared antennas for multiple wireless communication standards. The mobile device can communicate in a WLAN, a wireless personal area network (WPAN), and/or a WWAN.

FIG. 8 also provides an illustration of a microphone and one or more speakers that can be used for audio input and output from the mobile device. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

EXAMPLES

The following examples pertain to further embodiments.

Example 1 is a UE that includes a communication component, a rules component, and a network selection component. The communication component is configured to communicate over a 3GPP network and a non-cellular network. The rules component is configured to store an ANDSF MO that includes WLAN selection policies for network selection on the UE. The WLAN selection policies include I-WLAN policies and HS2.0 parameters. The network selection component is configured to select an available WLAN access network based on the WLAN selection polices of the ANDSF MO.

In Example 2, the WLAN selection policies for network selection of Example 1 can optionally include policies required for WLAN network selection without referencing another MO.

In Example 3, the network selection component of Examples 1-2 can optionally select the available WLAN access network during initial network selection.

In Example 4, the WLAN selection policies of Examples 1-3 are optionally stored under a WLANSP sub-tree of the ANDSF MO.

In Example 5, the WLAN selection policies of Examples 1-4 are optionally stored separately from an ISMP and an ISRP.

In Example 6, the HS2.0 parameters of Examples 1-5 are optionally obtained using ANQP.

In Example 7, the WLAN selection policies of Examples 1-6 can optionally include preferred service provider policies.

In Example 8, the preferred service provider policies of Example 7 can optionally include a policy based on an NAI realm.

Example 9 is a UE configured to communicate with one or more of an eNB in a 3GPP LTE or LTE-A network and a WLAN. The UE is configured to discover a set of available WLAN access networks. The UE is configured to prioritize the available WLAN access networks based on WLAN selection policies within a single rule set. The rule set includes WLAN selection policies based on HS2.0 parameters. The UE is configured to select a WLAN access network with a highest priority.

In Example 10, the WLAN selection policies of Example 9 can optionally include one or more of a policy based on an HS2.0 location parameter, a policy based on an HS2.0 venue parameter, a policy based on an HS2.0 access network type parameter, and a policy based on an HS2.0 backhaul load parameter.

In Example 11, discovering the set of available WLAN access networks in Examples 9-10 can optionally include discovering HS2.0 parameters using access network query protocol (ANQP).

In Example 12, the WLAN selection policies of Examples 9-11 can optionally include preferred service provider policies.

In Example 13, the UE of Examples 9-12 is optionally further configured to determine an active WLAN selection policy and the UE optionally prioritizes the available WLAN access networks based on the active WLAN selection policy.

In Example 14, the UE of Examples 9-13 can be optionally configured to apply one of an ISRP and an ISMP after prioritizing the available WLAN access networks.

Example 15 is a method for WLAN network selection. The method includes prioritizing available WLAN access networks based on a consolidated WLANSP within a single MO. The MO includes a PSPL and a PreferVplmnWlans. The method includes selecting a highest priority WLAN access network that interworks with a most preferred service provider in one of the PSPL and the PreferVplmnWlans. The method includes authenticating using a NAI based on one of the PSPL and the PreferVplmnWlans. The method further includes communicating 3GPP IP traffic over the selected WLAN access network.

In Example 16, the PSPL of Example 15 can optionally include one or more of an operator controlled list, a user controlled list, and a HPLMN controlled list.

In Example 17, selecting the highest priority WLAN of Examples 15-16 can optionally include, in response to roaming to a preferred VPLMN, selecting the highest priority WLAN access network that interworks with a most preferred service provider in the PreferVplmnWlans.

In Example 18, authenticating in Examples 15-17 can optionally include authenticating using EAP-AKA/EAP-AKA' authentication.

In Example 19, the PSPL of Examples 15-18 can optionally enable WLAN network selection without an SSID.

Example 20 is a computer program product that includes a computer-readable storage medium storing program code for causing one or more processors to perform a method. The method includes storing an ANDSF MO indicating network selection rules for a mobile wireless device. The network selection rules include one or more service provider identifiers indicating service provider preferences. The method includes establishing communication with the mobile wireless device. The method further includes synchronizing at least a portion of the ANDSF MO with the mobile wireless device. The at least a portion of the ANDSF MO includes the one or more service provider identifiers.

In Example 21, synchronizing the at least the portion of the ANDSF MO in Example 20 can optionally include synchronizing the one or more service provider identifiers comprising an OUI.

In Example 22, the OUI of Example 21 can optionally include an OUI registered with an IEEE registration authority.

In Example 23, synchronizing the at least the portion of the ANDSF MO in Examples 20-22 can optionally include synchronizing the one or more service provider identifiers include an NAI realm.

Example 24 is a method for selecting a WLAN access network. The method includes communicating over a 3GPP network and a non-cellular network. The method includes storing an ANDSF MO that includes WLAN selection policies for network selection on the UE. The WLAN selection policies include I-WLAN policies and HS2.0 parameters. The method further includes selecting an available WLAN access network based on the WLAN selection polices of the ANDSF MO.

In Example 25, the WLAN selection policies for network selection of Example 24 can optionally include policies required for WLAN network selection without referencing another MO.

In Example 26, selecting the WLAN access network of Examples 24-25 can optionally include selecting the available WLAN access network during initial network selection.

In Example 27, the WLAN selection policies of Examples 24-26 are optionally stored under a WLANSP sub-tree of the ANDSF MO.

In Example 28, the WLAN selection policies of Examples 24-27 are optionally stored separately from an ISMP and an ISRP.

In Example 29, the HS2.0 parameters of Examples 24-28 are optionally obtained using ANQP.

In Example 30, the WLAN selection policies of Examples 24-29 can optionally include preferred service provider policies.

In Example 31, the preferred service provider policies of Example 30 can optionally include a policy based on an NAI realm.

Example 32 is a method for selecting a WLAN access network. The method includes communicating with one or more of an eNB in a 3GPP LTE or LTE-A network and a WLAN. The method includes discovering a set of available WLAN access networks. The method includes prioritizing the available WLAN access networks based on WLAN selection policies within a single rule set. The rule set includes WLAN selection policies based on HS2.0 parameters. The method includes selecting a WLAN access network with a highest priority.

In Example 33, the WLAN selection policies of Example 32 can optionally include one or more of a policy based on an HS2.0 location parameter, a policy based on an HS2.0 venue parameter, a policy based on an HS2.0 access network type parameter, and a policy based on an HS2.0 backhaul load parameter.

In Example 34, discovering the set of available WLAN access networks in Examples 32-33 can optionally include discovering HS2.0 parameters using ANQP.

In Example 35, the WLAN selection policies of Examples 32-34 can optionally include preferred service provider policies.

In Example 36, the method of Examples 32-35 can optionally further include determining an active WLAN selection policy. Prioritizing can optionally include prioritizing the available WLAN access networks based on the active WLAN selection policy.

In Example 37, the method of Examples 32-36 can be optionally include applying one of an ISRP and an ISMP after prioritizing the available WLAN access networks.

Example 38 is a method for WLAN network selection. The method includes prioritizing available WLAN access networks based on a consolidated WLANSP within a single MO. The MO further includes a PSPL and a PreferVplmnWlans. The method includes selecting a highest priority WLAN access network that interworks with a most preferred service provider in one of the PSPL and the PreferVplmnWlans. The method includes authenticating using an NAI based on one of the PSPL and the PreferVplmnWlans. The method further includes communicating 3GPP IP traffic over the selected WLAN access network.

In Example 39, the PSPL of Example 38 can optionally include one or more of an operator controlled list, a user controlled list, and a HPLMN controlled list.

In Example 40, selecting the highest priority WLAN of Examples 38-39 can optionally include, in response to roaming to a preferred VPLMN, selecting the highest priority WLAN access network that interworks with a most preferred service provider in the PreferVplmnWlans.

In Example 41, authenticating in Examples 38-40 can optionally include authenticating using EAP-AKA/EAP-AKA' authentication.

In Example 42, the PSPL of Examples 38-41 can optionally enable WLAN network selection without an SSID.

Example 43 is a method for synchronizing an ANDSF MO. The method includes storing an ANDSF MO indicating network selection rules for a mobile wireless device. The network selection rules include one or more service provider identifiers indicating service provider preferences. The method includes establishing communication with the mobile wireless device. The method includes synchronizing at least a portion of the ANDSF MO with the mobile wireless device. At least a portion of the ANDSF MO comprises the one or more service provider identifiers.

In Example 44, synchronizing the at least the portion of the ANDSF MO in Example 43 can optionally include synchronizing the one or more service provider identifiers comprising an OUI.

In Example 45, the OUI of Example 44 can optionally include an OUI registered with an IEEE registration authority.

In Example 46, synchronizing the at least the portion of the ANDSF MO in Examples 43-45 can optionally include synchronizing the one or more service provider identifiers include an NAI realm.

Example 47 is an apparatus that includes means to perform a method in any of Examples 24-46.

Example 48 is a machine readable storage including machine-readable instructions that, when executed, implement a method or realize an apparatus of any of Examples 24-47.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom VLSI circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, procedure, or function. Nevertheless, the executables of an identified component need not be physically located together, but may comprise disparate instructions stored in different locations which, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention claimed is:

1. User equipment (UE) comprising:
a communication component configured to communicate over a wireless wide area network (WWAN) and a wireless local area network (WLAN);
a rules component configured to store an access network discovery and selection function (ANDSF) management object (MO) comprising WLAN selection policies providing a set of rules for WLAN network selection on the UE, the WLAN selection policies comprising interworking WLAN (I-WLAN) policies and WLAN access point (AP) automated-connection parameters, each member of the set of rules including:
a rule priority value establishing a relative priority of the member as compared to other members of the set, and
a list of one or more specified WLAN criteria under the member; and
a network selection component configured to:
determine from available WLAN access networks an available WLAN access network having attributes that fulfill a preferred list of one or more specified WLAN criteria under an applicable rule of the set of rules such that the attributes of the available WLAN access network are of a higher relative importance as compared to, based on the WLAN selection polices of the ANDSF MO, those of other available WLAN access networks, and
select the available WLAN access network from the available WLAN access networks.

2. The UE of claim 1, wherein WLAN selection policies for WLAN network selection on the UE comprise policies required for WLAN network selection that are referenced by a single MO.

3. The UE of claim 1, wherein the network selection component is configured to select the available WLAN access network during initial network selection.

4. The UE of claim 1, wherein the WLAN selection policies are stored under a WLAN selection policies (WLANSP) subtree of the ANDSF MO.

5. The UE of claim 1, wherein the WLAN selection policies are stored separately from an inter-system mobility policy (ISMP) and an inter-system routing policy (ISRP).

6. The UE of claim 1, wherein the attributes of the available WLAN access network are defined by the WLAN access point (AP) automated-connection parameters obtained using access network query protocol (ANQP).

7. The UE of claim 1, wherein the WLAN selection policies comprise preferred service provider policies.

8. The UE of claim 7, wherein the preferred service provider policies comprise a policy based on a network access identifier (NAI) realm.

9. User equipment (UE) configured to:
communicate with one or more of a base station in a wireless wide area network (WWAN) and a wireless local area network (WLAN);
discover a set of available WLAN access networks;
prioritize the available WLAN access networks based on WLAN selection policies within a single rule set, wherein the rule set comprises wireless local area network (WLAN) selection policies provided by the WWAN, each member of the rule set including:
a rule priority value establishing a relative priority of the member as compared to other members of the rule set, and
one or more WLAN attribute preferences under the member; and
select a WLAN access network best matching a desired priority and preference.

10. The UE of claim 9, wherein the WLAN selection policies comprise one or more of:
a policy based on a WLAN AP automated-connection location parameter;
a policy based on a WLAN AP automated-connection venue parameter;
a policy based on a WLAN AP automated-connection access network type parameter; and
a policy based on a WLAN AP automated-connection backhaul load parameter.

11. The UE of claim 9, wherein the WLAN selection policies comprise preferred service provider policies.

12. The UE of claim 11, further configured to determine an active WLAN selection policy, wherein the UE prioritizes the available WLAN access networks based on the active WLAN selection policy.

13. The UE of claim 9, further configured to apply one of an inter-system routing policy (ISRP) and an inter-system mobility policy (ISMP) after prioritizing the available WLAN access networks.

* * * * *